(12) United States Patent
Hu et al.

(10) Patent No.: US 8,488,652 B2
(45) Date of Patent: Jul. 16, 2013

(54) SYSTEMS AND METHODS FOR BLIND EQUALIZATION IN A DIGITAL RECEIVER

(75) Inventors: Junquiang Hu, Davis, CA (US); Huy Dung Han, Cupertino, CA (US); Dayou Qian, Cupertino, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 128 days.

(21) Appl. No.: 12/911,416

(22) Filed: Oct. 25, 2010

(65) Prior Publication Data

US 2011/0261867 A1 Oct. 27, 2011

Related U.S. Application Data

(60) Provisional application No. 61/312,696, filed on Mar. 11, 2010.

(51) Int. Cl.
*H04B 1/00* (2006.01)
*H03F 3/45* (2006.01)

(52) U.S. Cl.
USPC .............................. 375/148; 381/86; 330/253

(58) Field of Classification Search
USPC ............................................ 375/148; 381/86
See application file for complete search history.

(56) References Cited

U.S. PATENT DOCUMENTS

| | | | | |
|---|---|---|---|---|
| 5,921,921 A * | 7/1999 | Potratz et al. | ................. | 600/323 |
| 5,978,742 A * | 11/1999 | Pickerd | ............................ | 702/66 |
| 5,982,785 A * | 11/1999 | Woerner et al. | ................ | 370/488 |
| 5,990,742 A * | 11/1999 | Suzuki | .......................... | 330/253 |
| 6,111,531 A * | 8/2000 | Farag | .............................. | 341/143 |
| 6,417,792 B1 * | 7/2002 | King et al. | ...................... | 341/143 |
| 6,618,433 B1 * | 9/2003 | Yellin | ............................. | 375/148 |
| 2002/0159141 A1 * | 10/2002 | Choa | .............................. | 359/349 |
| 2002/0181717 A1 * | 12/2002 | Eid | .................................. | 381/86 |
| 2003/0068994 A1 * | 4/2003 | Sayeed et al. | ................. | 455/295 |
| 2008/0189532 A1 * | 8/2008 | Haratsch | ....................... | 712/239 |
| 2011/0103454 A1 * | 5/2011 | Bose et al. | ..................... | 375/232 |

OTHER PUBLICATIONS

Ofir Shalvi, et al., New Criteria for Blind Deconvolution of Nonminimum Phase Systems (Channels), IEEE Transactions on Information Theory, vol. 36, No. 2, pp. 312-321, 1990.

Jitendra K. Tugnait, Comments on "New Criteria for Blind Deconvolution of Nonminimum Phase Systems (Channels)", IEEE Transactions on Information Theory, vol. 38, No. 1, pp. 210-213, 1992.

Raymond Pickholtz, Khairy Elbarbary, The Recursive Constant Modulus Algorithm; A New Approach for Real-Time Array Processing, IEEE, 1993.

Ye Li, Zhi Ding, Global Convergence of Fractionally Spaced Godard (CMA) Adaptive Equalizers, IEEE Transactions on Signal Processing, vol. 44, No. 4, pp. 818-826, 1996.

Zhi Ding, et al., Single-Channel Blind Equalization for GSM Cellular Systems, IEEE Journal on Selected Areas in Communications, vol. 16, No. 8, 1998.

(Continued)

*Primary Examiner* — Leon-Viet Nguyen
*Assistant Examiner* — Sarah Hassan
(74) *Attorney, Agent, or Firm* — Joseph Kolodka

(57) ABSTRACT

A digital receiver system to recover signals from inter-symbol-interference includes a finite impulse response (FIR) filter using convolution to recover signals; and a channel estimator coupled to the FIR filter to estimate FIR coefficients, wherein the channel estimator uses a second order expectation and a fourth order expectation from a convolution to calculate error function.

14 Claims, 4 Drawing Sheets

OTHER PUBLICATIONS

Dominique Godard, Self-Recovering Equalization and Carrier Tracking in Two-Dimensional Data Communication Systems, IEEE Transactions on Communications, vol. COM-28, No. 11, pp. 1867-1875, 1980.

John R. Treichler, et al., A New Approach to Multipath Correction of Constant Modulus Signals, IEEE Transactions on Acoustics, Speech, and Signal Processing, vol. ASSP-31, No. 2, pp. 459-472, 1983.

Brian G. Agee, The Least-Squares CMA: A New Technique for Rapid Correction of Constant Modulus Signals, IEEE Transactions on Acoustics, Speech, and Signal Processing, pp. 953-956, 1968.

Yuxin Chen, T. Le-Ngoc, B. Champagne, and Changjiang Xu. Recursive least squares constant modulus algorithm for blind adaptive array. IEEE Trans. Signal Process., 52(5):1452-1456, May 2004.

P. A. Regalia. A finite-interval constant modulus algorithm. In Proc. IEEE International Conference on Acoustics, Speech, and Signal Processing (ICASSP 2002), vol. 3, pp. 2285-2288, May 13-17, 2002.

V. Zarzoso and P. Comon. Optimal step-size constant modulus algorithm. IEEE Trans. Commun., 56(1):10-13, Jan. 2008.

* cited by examiner

SYSTEMS AND METHODS FOR BLIND EQUALIZATION IN A DIGITAL RECEIVER

This application claims priority to provisional Ser. No. 61/312,696 filed Mar. 11, 2010, the content of which is incorporated by reference.

BACKGROUND

Signal equalization is needed in a digital receiver system to recover signals over multi-path channel. Such a multi-path channel, for example wireless channel that has reflections, and optical channel using polarization multiplexing (Pol-Mux) which may have inter-polarization signal mixing, causes inter-symbol-interference (ISI). Equalization method is used in such system to remove the ISI and recover the original signal.

Blind equalization is commonly used in these systems. One reason is because transmitting training symbols is sometime undesirable or costly; another is that in some cases blind equalization has better noise tolerance comparing to training-based solutions. Blind equalization typically achieves parameter optimization through cost minimization using stochastic gradient descent in both batch and adaptive algorithms. In general, stochastic descent algorithms typically require large number of iterations or long data samples to converge. The batch approach is generally based on data reuse (recycling) and refiltering to recompute the cost gradient after each iterative parameter update, thereby causing long processing delays.

Commonly used blind equalizers include Constant Modulus Algorithm (CMA) and Shalvi-Weinstein Algorithm (SWA). For these two techniques, the criteria for equalizer parameter optimization (adaptation) are based on minimizing cost functions that depends on the 4th-order statistics of the equalizer output and the channel output signals. Given limited number of channel output data samples, equalizer's parameter adaptation can only be approximated. One simple approximation approach is to apply stochastic gradient descent (SGD) with the CMA or the SWA such that the statistical expectation in the gradient calculation is removed, and that the gradient at each iteration is approximated by its instantaneous value. The SGD implementation of the CMA/SWA can be carried out either by utilizing fresh data samples from channel output in each iteration, or by recycling the same set of channel output data multiple times. The traditional SGD usually requires a large number of channel output samples to converge, thereby making some short packet data applications unsuitable. Alternatively, the same set of channel output samples are recycled in SGD iterations. This recycled SGD (RC-SGD) implementation can be applied even though the size of the channel output samples is relatively short (e.g. in GSM). The shortcoming of the RC-SGD is that in each iteration, the equalizer output has to be recalculated for the recently updated equalizer. This recycling and recalculation process is sequential and can lead to idle time, leading to long process delays. In addition, both SGD require large number of iterations to approach the steepest descent, causing slow convergence and improper adjustment.

FIG. 1 is an exemplary block diagram of a conventional system. Signal input x(k) 102 is first written into buffer 104, which is particularly needed in RC-SGD case so that the data can be used repeatedly. Readout data 112 from buffer 104 is fed to both the convolution block 106 to calculate output based on current parameters, and to CMA/SWA module 110 as input for parameter update. Convolution output y(k) (108) is the decoded output signal, and fed back to CMA/SWA 110 for update as well. The updated parameters w are passed to convolution block 106 for next sample processing.

One drawback for blind equalization is the need of long samples sequence for convergence, i.e., from the starting of initial state to the state reaching optimum output. For example, a Constant Modulus Algorithm (CMA) may need over 10,000 samples to get convergence. This long convergence time may result in long processing latency, which should be avoided in time-sensitive applications; or the long latency may cause the system to be unable to track the fast changing of a dynamic channel. One example for the latter scenario is in optical communication using Pol-Mux for long distance transmission, which may cause polarization rotating frequency above kilo-Hertz, thus long convergence time may not be able to track the polarization change.

Also, conventional techniques are not suitable for parallel processing, for example a system contains multiple chips that can perform channel tracking in parallel, the convergence time does not benefit from this parallelization. This either result in independent processing of each component, or waste of resource in having some components idling.

SUMMARY

In one aspect, a digital receiver system to recover signals from inter-symbol-interference includes a finite impulse response (FIR) filter using convolution to recover signals; and a channel estimator coupled to the FIR filter to estimate FIR coefficients, wherein the channel estimator uses a second order expectation and a fourth order expectation from a convolution output to calculate error function.

Implementations of the above aspect may include one or more of the following. The channel estimator determines the second and fourth order expectations $x_{i_2}^*$ and $x_{i_4}^*$ of a channel output signal by averaging the channel output signal $$E[x_{i_1}(k)x_{i_2}^*(k-l_1)x_{i_3}^*(k-l_2)x_{i_4}^*(K-l_3)] \text{ and}$$
$$E[x_{i_1}(k)x_{i_2}^*(k-l_1)], \text{ for } l_1, l_2, l_3 \in \{-L_w, \ldots, L_w\}$$
$$\text{and } i_1, i_2, i_3, i_4 \in \{1, \ldots, p\}.$$

The system can use a steepest descent (ascent) algorithms to achieve convergence. The second and fourth order expectations are determined based on a batch of input. The expectations from the batch are provided to an equalizer error function to update coefficients. The second and fourth order expectations are determined in parallel. Multiple expectation results are added together for accuracy. The cumulated multiple expectation results can be used to update an error function. The second and fourth order expectations are determined separately from an equalization error determination. The channel estimator can be a blind equalizer such as a Constant Modulus Algorithm (CMA) equalizer or other suitable equalizers. The CMA equalizer can use an error function with steepest descent or ascent. The system can be an open loop architecture where only inputs are used to update coefficients in an open loop and outputs are not used for coefficient updating.

In another aspect, a method for receiving data in a digital receiver includes applying a finite impulse response (FIR) filter in a convolution to recover signals; estimating FIR coefficients for each channel using a second and fourth order expectations from a convolution output to calculate error function; and recovering transmitted signals from inter-symbol-interference in the digital receiver.

In yet another aspect, a method for receiving data in a digital receiver includes determining second and fourth order expectations of a channel output signal by averaging the channel output signal $E[x_{i_1}(k)x_{i_2}^*(k-l_1)x_{i_3}^*(k-l_2)x_{i_4}^*(K-l_3)]$ and
$E[x_{i_1}(k)x_{i_2}^*(k-l_1)]$, for $l_1, l_2, l_3 \in \{-L_w, \ldots, L_w\}$; and applying a steepest descent (ascent) algorithms to achieve convergence and determining gradients each update; and recovering transmitted signals from inter-symbol-interference in the digital receiver.

Advantages of the preferred embodiments may include one or more of the following. The system requires less convergence time, and enables the usage of all the possible processing power in the system t for even faster convergence, and less delay. The system can accurately approximate the steepest descent blind optimization without having to refilter the equalizer input in each iteration. In particular, the batch process is open-loop in the sense that the steepest descent direction of the CMA and the MED can be determined directly from the channel output samples and the current equalizer parameters without any sequential computation of filtering, convolution or FFT/IFFT. Instead of deploying a closed-loop, the system uses open-loop batch technique, which calculates statistics from input only and no feedback from output is applied. This is achieved by extracting the fourth-order and second-order statistics of feedback signal using input and current parameters, and by using multiple inputs for batch processing to get higher approximation accuracy, and then following the cost functions as in prior equalization techniques to adjust current parameters. The resulting SGD adaptation is more accurate and facilitates faster equalizer convergence. The optimum selection of the adaptation step-size can be adjusted to avoid instability. The implementation of this open-loop adaption also makes frequency domain equalization much simpler. Simulation results show that the system requires fewer data and iterations than those of the stochastic CMA and MED. The system is also more robust to the step-size variation than their stochastic counterparts.

DESCRIPTION

Channel estimation for an equalizer is to estimate the FIR coefficients which are to be applied to the input signals for a digital receiver. In this description CMA is used as an example to explain the process.

Signal input x(k) 202 is provided to statistics block 204, whose output is buffered by statistics storage 206. Data from storage 206 is provided to batch CMA/SWA module 210 as input for parameter update. Convolution output y(k) (208) is the decoded output signal, and receive CMA/SWA data from 210 where updated parameters w are passed to convolution block 208 for next sample processing.

Figure 1:
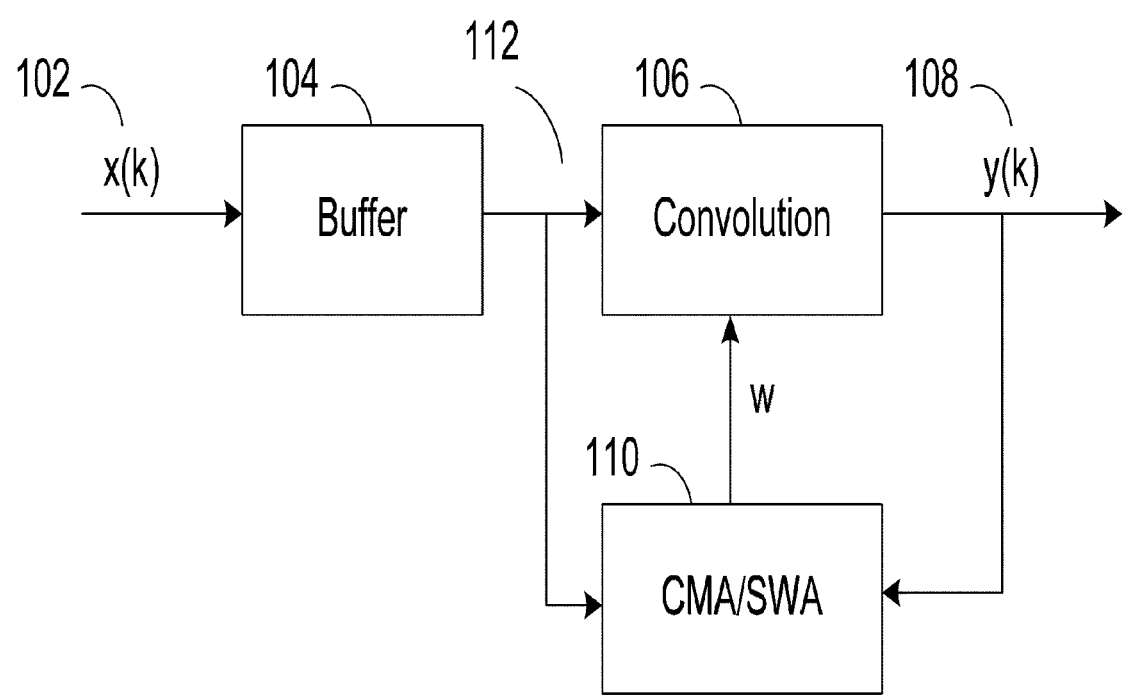
FIG. 1 is an exemplary block diagram of a conventional system.
Figure 2:
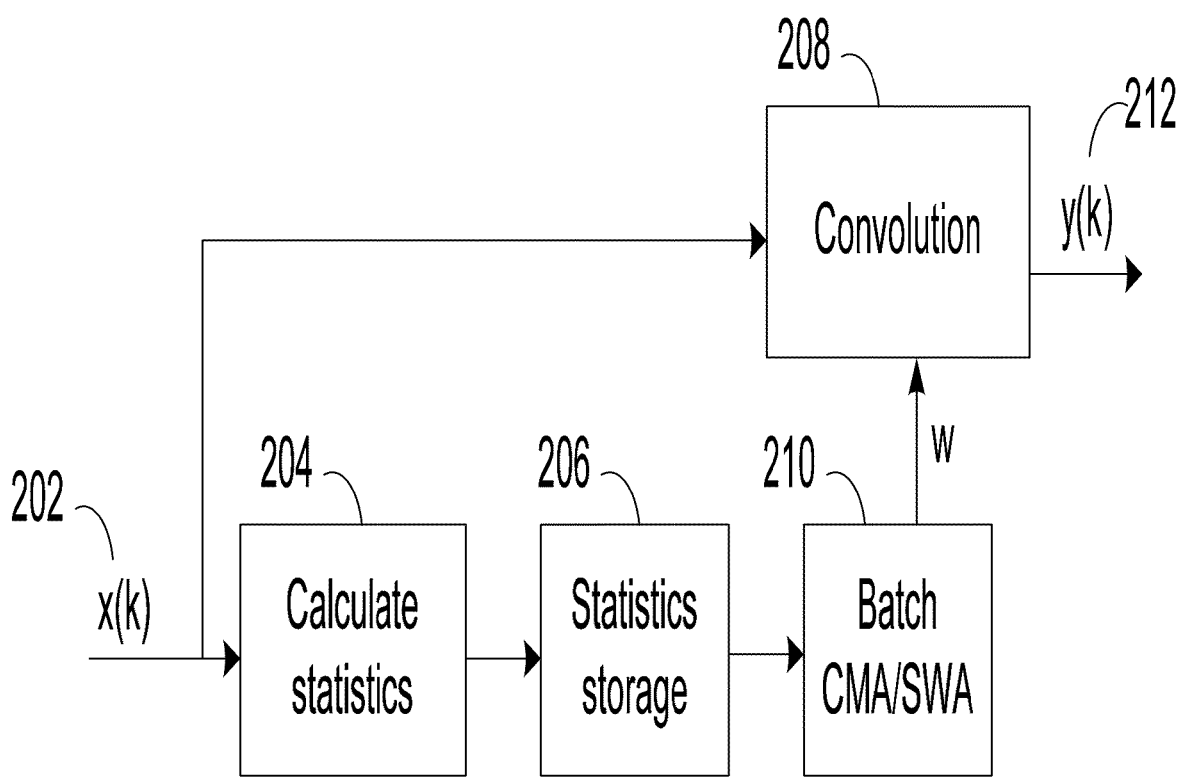
FIG. 2 shows an exemplary diagram of one embodiment of the present invention.

Instead of deploying a closed-loop, the system of FIG. 2 uses open-loop batch processing, which determines statistics from input only and requires no feedback from output. This is achieved by extracting a fourth-order and second-order statistics of feedback signal using input and current parameters, and by using multiple inputs for batch processing to get high approximation accuracy, and then following the cost functions to adjust current parameters.

Figure 3:
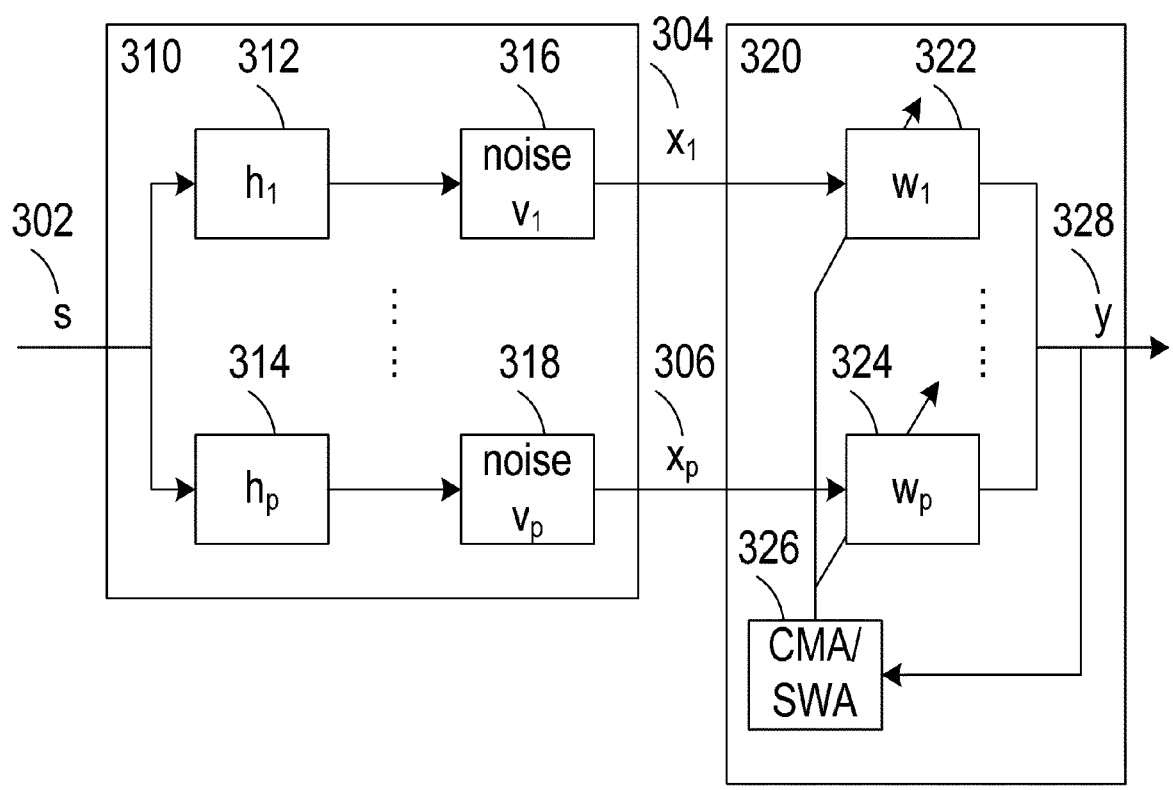
FIG. 3 shows an exemplary diagram for a single carrier single-input multiple-output (SIMO) system.

FIG. 3 shows an exemplary diagram for a single carrier single-input multiple-output (SIMO) system, for example, a wireless receiver system. The system has p receiver paths, such as p antennas. Transmitted signal 302 is s, while s(k) denotes the transmitted symbol at time instance k. Signal 302 is transmitted over channel 310, which includes multipath sub-channels such as 312 and 314, and noise adding blocks 316 and 318 whose outputs are $x_1$ 304 and $x_p$ 306. The multipath channel can be simplified by FIR (finite-impulse-response) filters $h_i$ with maximum length of $L_h+1$ and noise for each sub-channel is defined as $v_i(k)$. The channel output from 310 can be expressed as:

$$x_i(k) = h_i(k) * s(k) + v_i(k)$$

$$= \sum_{m=0}^{L_h} h_i(m)s(k-m) + v_i(k)$$

The received samples are passed through a set of finite FIR filters, for example FIR 322 and 324, with coefficients $w_i(k)$, $i=1, \ldots, p$, and order $L_w$. These coefficients are achieved by channel estimation block 326, using CMA or SWA or other techniques. The filter output y(k) becomes:

$$y(k) = \sum_{i=1}^{p} w_i^*(k) * x_i(k)$$

where $$w_i = [w_i(0) w_i(1) \ldots w_i(L_w)]^T,$$

$$w = [w_1^T w_2^T \ldots w_p^T]^T,$$

$$x_j(k) = [x_j(k) x_j(k-1) \ldots x_j(k-L_w)]^T,$$

$$x(k) = [x_1^T(k) x_2^T(k) \ldots x_p^T(k)]^T$$

The equalizer output 328 is provided to CMA/SWA block 326. The output 328 can be represented as:

$$y(k) = \sum_{i=1}^{p} w_i^H x_i(k)$$

$$= w^H x(k).$$

The CMA cost as a function of equalizer output sequence is defined as:

$$J_{CMA} = \frac{1}{4} E\left[(|y(k)|^2 - R_2)^2\right]$$

where $$R_2 = \frac{E[|s(k)|^4]}{E[|s(k)|^2]}$$

CMA minimizes the cost as defined above. The equalizer can be found by the gradient algorithm with an update formula of:

$$\underset{\text{coefficient}}{\underset{|}{w^{(k+1)}}} = \underset{\text{coefficient}}{\underset{|}{w^{(k)}}} - \underset{\text{Step size}}{\underset{|}{\mu}} \boxed{\left\{\overset{\text{Error function}}{\overbrace{\tfrac{1}{4}\nabla_w E[|y(k)|^4] - \tfrac{R_2}{2}\nabla_w E[|y(k)|^2]}}\right\}}$$

which can be further expressed as:

$$w^{(k+1)} = w^{(k)} - \mu \frac{\nabla_w E[|y(k)|^4]E[|y(k)|^2] - 2\nabla_w E[|y(k)|^2]E[|y(k)|^4]}{E^3[|y(k)|^2]}$$

The above equations show that the CMA cost function is based on the second and fourth order statistics of the equalizer output. From this observation, a batch technique is used which relies on the channel output statistics. The calculation includes the auto correlation and the fourth order cumulant of the equalizer output as a function of equalizer coefficients. Define $W=ww^H$ and $X_k=x(k)x^H(k)$, the above 4th and 2nd order expectation equations can be rewritten as:

$$E[|y(k)|^2] = E[w^H x_k x_k^H w]$$
$$= w^H E[X_k]w$$
$$\nabla E[|y(k)|^2] = E[X_k]w$$

$$E[|y(k)|^4] = E[w^H x(k)x^H(k)ww^H x(k)x^H(k)w]$$
$$= w^H E[X_k ww^H X_k]w$$
$$= Tr(E[X_k W X_k]W)$$
$$= vec^H(W^H)vec\{E[X_k W X_k]\}$$
$$= vec^H(W)E[X_k^T \otimes X_k]vec(W)$$

$$\nabla E[|y(k)|^4] = \nabla E[w^H X_k ww^H X_k w]$$
$$= 4E[X_k W X_h]w$$
$$= 4mat\{vec(E[X_k W X_k])\}w$$
$$= 4mat(E[X_k^T \otimes X_k]vec(W))w$$

Here $\otimes$ denotes the Kronecker product, vec (X) operation converts the matrix X into a vector x that its elements are the cascade of all columns of X and the mat (x) operation converts the vector x back to its matrix form.

The above mentioned batch technique can be implemented in two steps:

1. Calculate the necessary second and fourth order statistics of the channel outputs by averaging the channel output signal:

$$E[x_{i_1}{}^*(k)x_{i_2}{}^{*(k-l_1)}x_{i_3}{}^*(k-l_2)x_{i_4}{}^*(k-l_3)]$$

And $$E[x_{i_1}(k)x_{i_2}{}^*(k-l_1)]$$

Where $l_1, l_2, l_3 \in \{-L_w, \ldots, L_w\}$, and $i_1, i_2, i_3, i_4 \in \{1, \ldots, p\}$ 2. Use the steepest descent (ascent) algorithms with CMA cost to achieve convergence. At each update, $E[|y(k)|^4]$, $E[|y(k)|^2]$ and their gradients need to be calculated.

Applying the above processes in FIG. 2, signal input 202 is provided to both convolution block 208 (an FIR filter) and statistic calculation block 204, to get recovered signal output and estimate the channel, respectively. Statics calculation block 204 uses step 1 for 4th and 2nd order expectations. The output from 204 is buffered by storage block 206 and further used by channel estimation algorithm 210, either using CMA, or SWA, or other algorithms. The output from 210 is the estimated channel efficient w which is passed to convolution block 208 for signals output.

In one embodiment of the present invention, the 4th order and 2nd order expectations can be calculated from a batch of input signals. The input signals can be recycled for one or more iterations, so that convergence can be achieved with shorter frame.

Figure 4:
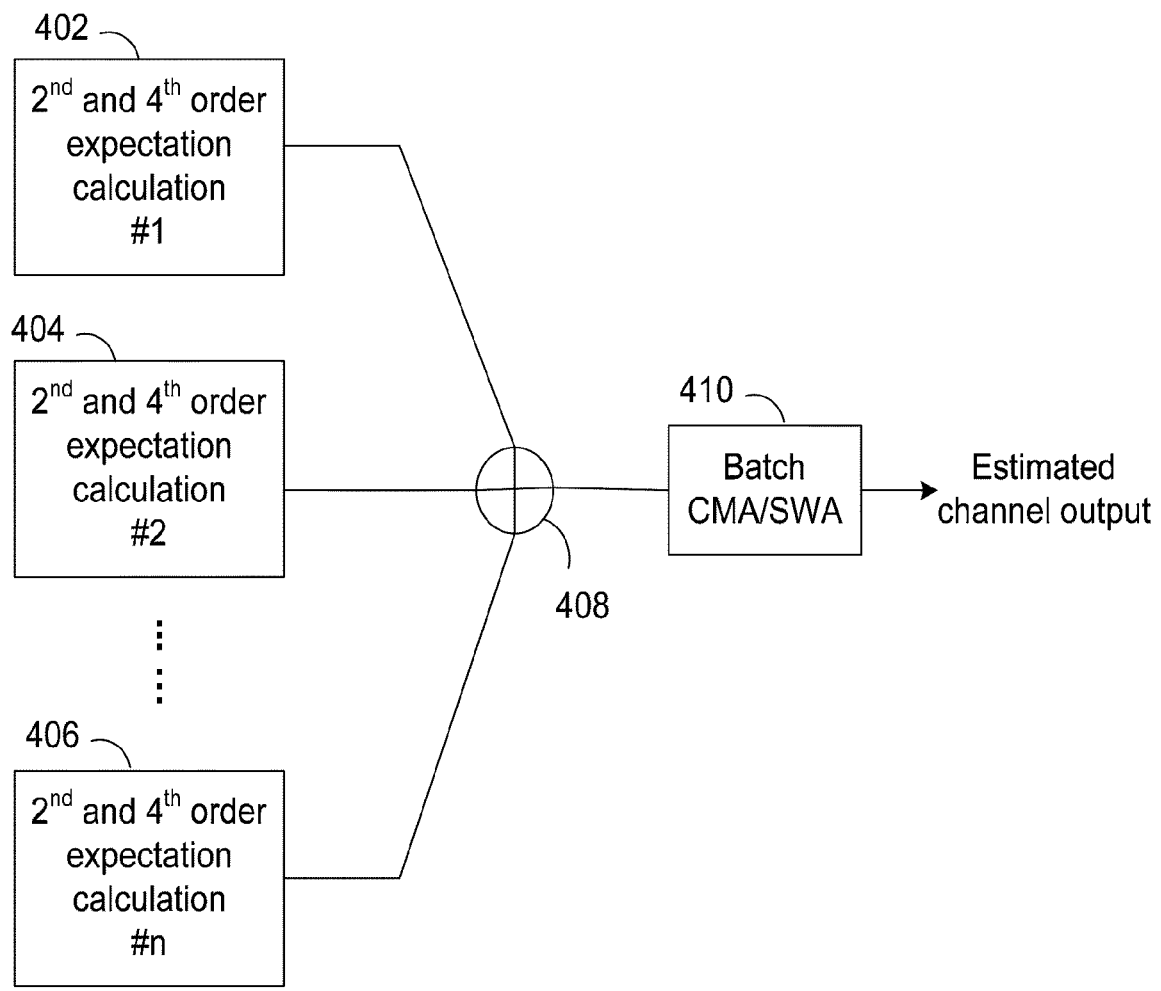
FIG. 4 shows an exemplary process to perform parallel calculation of 4th and 2nd order expectations.

In another embodiment, multiple modules can calculate the 4th order and 2nd order expectations in parallel, and the results can be added together for higher approximation accuracy, so that larger adjustment step size can be applied for faster convergence. This is shown in FIG. 4, which contains n expectation calculation blocks such as block 402, 404, and 406. The outputs from these blocks are added together through 408, and then passed to batch estimation block 410 for estimated channel output.

In a further embodiment, the step size to adjust the parameters (estimated channel) can be increased than that used with single calculation block.

The above system performs the steepest descent parameter optimization in blind channel equalizers based on 4-th order statistics. The system does not require data recycling, nor does it need to recalculate the equalizer output statistics in each iteration. The method reduces idle time in equalizer update between iterations. By separating the step for estimating statistics from the equalizer updating step, the idle time and delay needed when waiting for recalculation of equalizer outputs are eliminated. The batch process is also more robust to incorrect adjustment and their step-sizes can be set to higher values than that of stochastic CMA. The system can be applied with the frequency domain equalization more effectively. Although CMA is discussed above, other cost functions to avoid the local minima can be used. Further, the systems can incorporate additional constraints for controlling equalizer convergence.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a digital receiver is discussed next. The digital receiver is essentially a computer with transceivers that can be wired or wireless. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A digital receiver system to recover signals from inter-symbol-interference, comprising:
   a. a finite impulse response (FIR) filter using convolution to recover signals; and
   b. a channel estimator coupled to the FIR filter to estimate FIR coefficients, wherein the channel estimator uses a second order expectation and a fourth order expectation from a convolution to calculate error function, the second and fourth order expectations are determined in parallel, and multiple expectation results are added together for accuracy.

2. The receiver of claim 1, wherein the channel estimator determines the second and fourth order expectations $x_{i_2}^*$ and $x_{i_4}^*$ of a channel output signal by averaging the channel output signal $$E[x_{i_1}(k)x_{i_2}^*(k-l_1)x_{i_3}^*(k-l_2)x_{i_4}^*(K-l_3)] \text{ and } E[x_{i_1}(k)x_{i_2}^*(k-l_1)],$$

for $l_1, l_2, l_3 \in \{-L_w, \ldots, L_w\}$ and $i_1, i_2, i_3, i_4 \in \{1, \ldots, p\}$.

3. The receiver of claim 1, wherein the channel estimator uses a steepest descent or ascent process to achieve convergence and wherein gradients are determined for each update.

4. The receiver of claim 1, wherein the second and fourth order expectations are determined based on a batch of input.

5. The receiver of claim 4, wherein the expectations from the batch are provided to an equalizer error function to update coefficients.

6. The receiver of claim 1, wherein multiple expectation results are added together and update an error function.

7. The receiver of claim 1, wherein the second and fourth order expectations are determined separately from an equalization error determination.

8. The receiver of claim 1, wherein the channel estimator comprises a blind equalizer.

9. The receiver of claim 8, wherein the channel estimator comprises a Constant Modulus Algorithm (CMA) equalizer.

10. The receiver of claim 9, wherein the CMA equalizer comprises an error function with steepest descent or ascent.

11. The receiver of claim 1, wherein only inputs are used to update coefficients in an open loop and outputs are not used for coefficient updating.

12. The receiver of claim 1, where the convolution is done in frequency domain using multiplication.

13. A digital receiver system to recover signals from inter-symbol-interference, comprising:
   a. a finite impulse response (FIR) filter using convolution to recover signals; and
   b. a channel estimator coupled to the FIR filter to estimate FIR coefficients, wherein the channel estimator uses a second order expectation and a fourth order expectation from a convolution to calculate error function, the second and fourth order expectations are determined in parallel and multiple expectation results are added together and an error function is updated.

14. A digital receiver system to recover signals from inter-symbol-interference, comprising:
   c. a finite impulse response (FIR) filter using convolution to recover signals; and
   d. a channel estimator coupled to the FIR filter to estimate FIR coefficients, wherein the channel estimator uses a second order expectation and a fourth order expectation from a convolution to calculate error function and the second and fourth order expectations are determined separately from an equalization error determination.

* * * * *